May 7, 1968  J. D. MARTIN  3,381,724
ATTACHMENT FOR RADIAL ARM SAWS
Filed Jan. 18, 1966  3 Sheets-Sheet 1
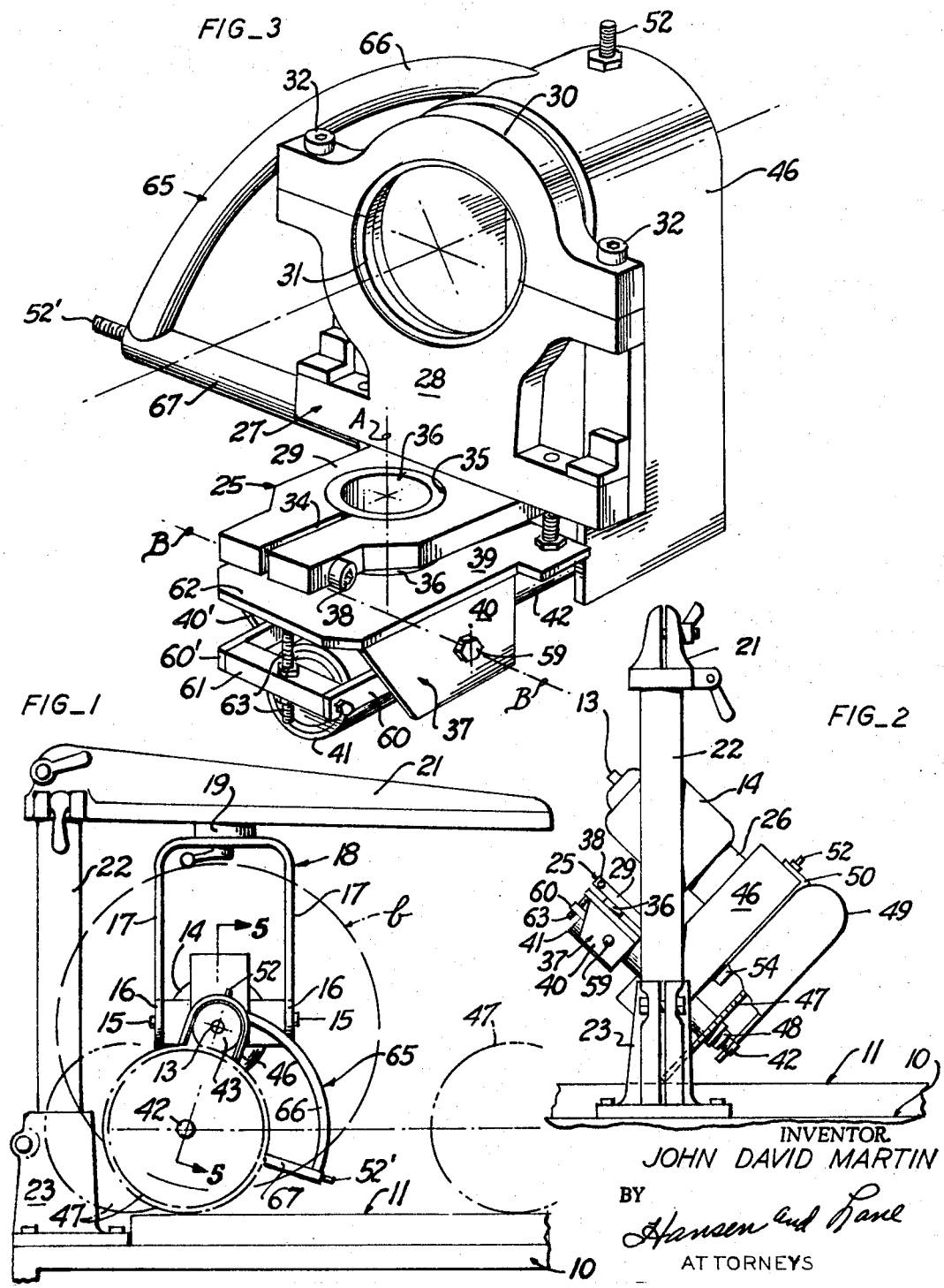
INVENTOR.
JOHN DAVID MARTIN
BY
Hansen and Lane
ATTORNEYS

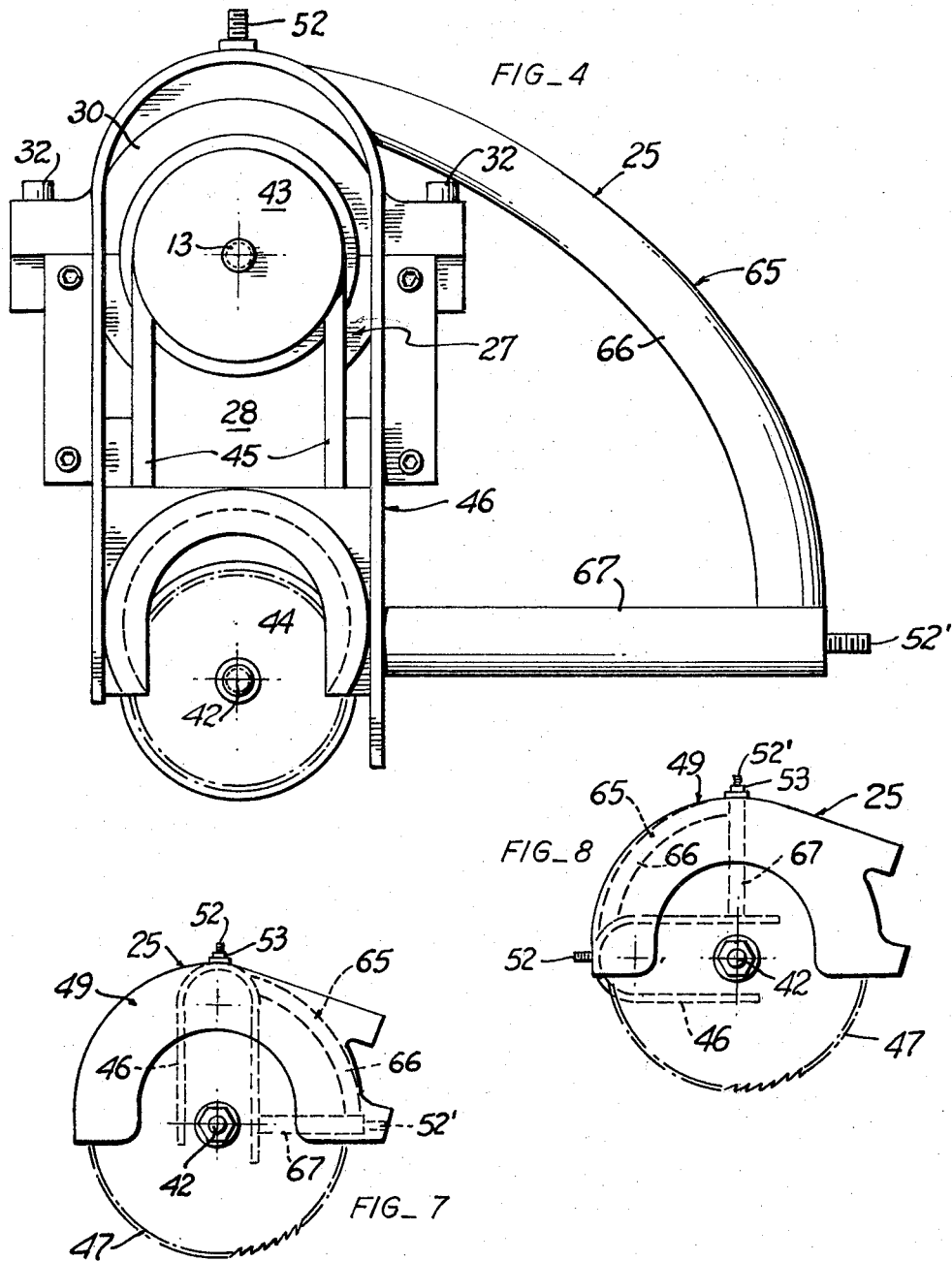

May 7, 1968   J. D. MARTIN   3,381,724
ATTACHMENT FOR RADIAL ARM SAWS
Filed Jan. 18, 1966   3 Sheets-Sheet 3
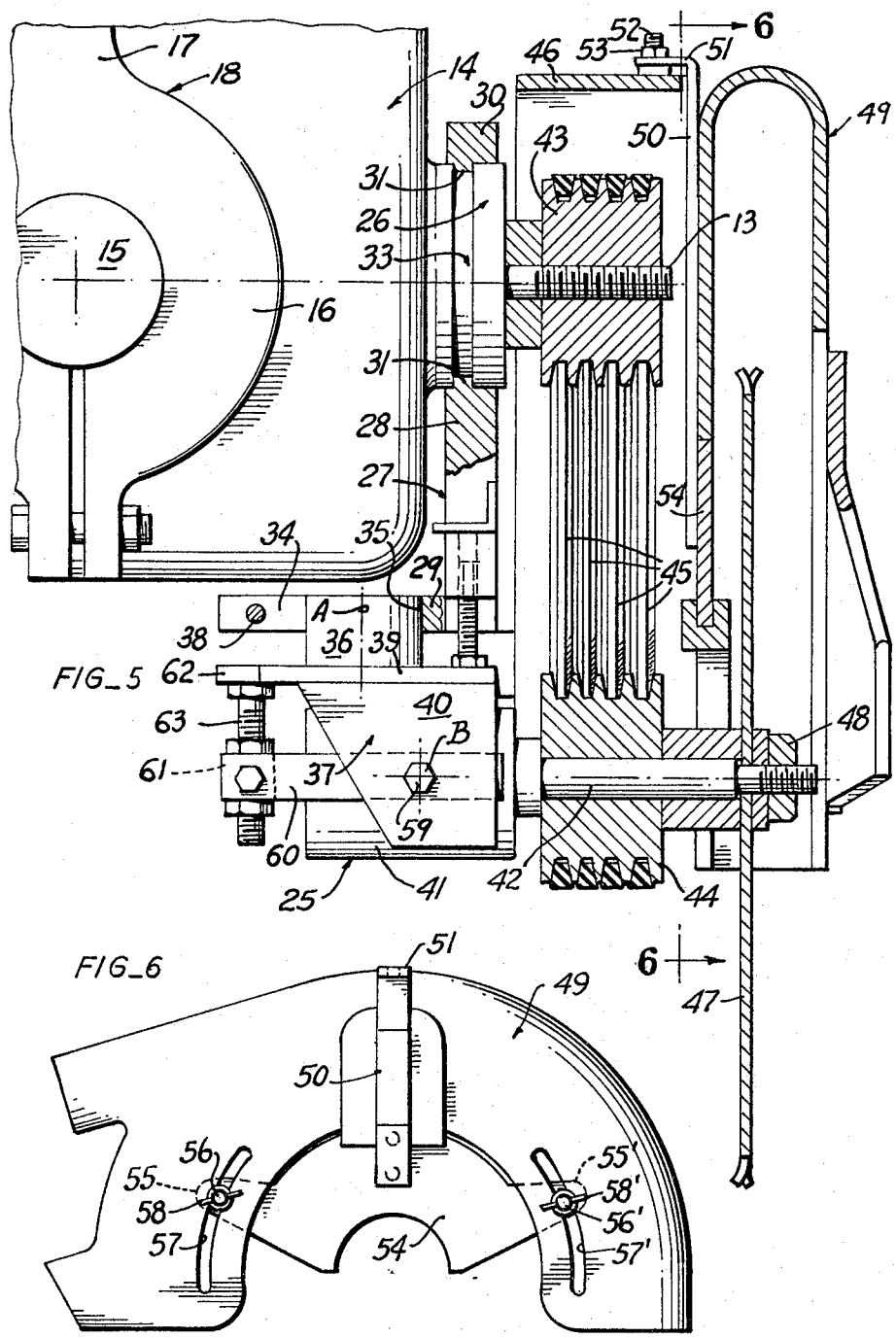
INVENTOR.
JOHN DAVID MARTIN
BY
Hansen and Lane
ATTORNEYS

United States Patent Office 3,381,724
Patented May 7, 1968

3,381,724
ATTACHMENT FOR RADIAL ARM SAWS
John David Martin, 2137 Amberwood Lane,
San Jose, Calif. 95132
Filed Jan. 18, 1966, Ser. No. 521,334
7 Claims. (Cl. 143—6)

ABSTRACT OF THE DISCLOSURE

An auxiliary spindle attachment facilitating use of a smaller than normally required circular blade on a radial arm saw. A frame attachable to the blade supporting side of the motor of a conventional radial arm saw and including a yoke for supporting a bearinged blade supporting spindle in offset, parallel relation to the motor shaft, yet closer than the latter to the work supporting table and adjustable about both vertical and horizontal axes to achieve various cutting angles and adjustments.

---

This invention relates to radial arm saws and more particularly to an attachment for radial arm saws.

A radial arm saw is so named because it consists of a motor mounted in a yoke suspended from an arm which extends radially from an upright standard. The motor has a circular saw blade mounted on its motor shaft and is adapted to be drawn to and fro parallel to the radial arm to cut through material on a table.

More than 50% of the wooden members to be cut on a construction job are a nominal four inches thick requiring at least 3⅝ inches of blade radius. When it is considered that the motor obstructs about 3¾ inches of the radius of the saw blade we find a blade radius requirement of 7⅜ inches or a circular blade of at least 14¾ inches in diameter. Since these blades come in sizes of two inch increments, it will be appreciated that a 16 inch blade is needed for more than 50% of the wooden members to be cut. Moreover, as such blades wear or by resharpening diminish in size to less than 14¾ inches in diameter, it will be appreciated that they become obsolete and must be replaced. The cost of 16 inch blades is appreciably greater than those of lesser diameter. Frequently replacement of such obsolete blades is therefore expensive.

It is an object of the present invention to provide an attachment for radial arm saws facilitating the use of blades of smaller diameter than normally required without the attachment.

FIG. 1 is a side view of a radial arm saw bed showing the attachment of the present invention applied to the saw.

FIG. 2 is an end view of FIG. 1 as seen from the left hand end thereof.

FIG. 3 is a perspective view of the frame of the attachment embodying the present invention.

FIG. 4 is an elevational view of the frame of FIG. 3 and showing the opposite side thereof.

FIG. 5 is an enlarged detail section through the attachment taken substantially along line 5—5 in FIG. 1.

FIG. 6 is a rear elevation view of the saw blade guard as seen from line 6—6 in FIG. 5.

FIGS. 7 and 8 show the guard of FIGS. 5 and 6 arranged differently on the frame for different cuttings.

Before describing the attachment embodying the present invention the general characteristics of a conventional radial arm saw will be explained. In FIGS. 1 and 2 a radial arm saw is shown as mounted on a frame 10 adjacent to a flat bed or table 11 upon which lumber is placed and held in a proper position to be cut by the saw blade.

In a conventional saw of the radial arm type the blade *b* of the diameter shown in phantom in FIG. 1 is mounted on the shaft 13 of a motor 14. The motor 14 has trunnion bosses 15 at its sides mounted on bearings 16 on the ends of the arms 17 of a yoke 18. The upper end of the yoke 18 is suspended from a carriage 19 slidably mounted on an arm 21 which extends across the table 11. The arm 21 is supported above the table 11 from the top of a vertical post or standard 22. The arm 21 extends radially from the post 22 and the latter is manually adjustable up and down relative to a sleeve 23 supported on the frame 10 to raise and/or lower the center of the motor shaft 13 relative to the table 11 for different sized blades and for varying the depth of cut.

It will be noted in FIG. 5 that the motor 14 is of such a size as to extend radially into an appreciable portion of the center zone of a blade such as to limit the depth of cut that can be made with a blade mounted on the motor shaft. For example, note in FIG. 5 that the motor 14 extends downwardly from its spindle shaft 13 a distance of almost 4 inches thus obstructing that much of the blade radius from entering a wooden member to be cut.

The present invention contemplates the offsetting of the power shaft and facilitating the use of smaller diametered blades, yet accomplishing as great or a greater depth of cut. In other words, less central zone of a blade is obstructed leaving a greater portion of the blade radius free to enter wooden members to be cut. The offsetting of the power shaft is accomplished by an attachment 25 embodying the present invention and now to be explained.

As best seen in FIG. 5 the blade mounting side of the motor 14 of a conventional saw has a boss 26 circumscribing its motor shaft 13. This boss 26 provides a mounting for a guard required by law to cover a blade mounted on such motor shaft. However, when the guard is removed, the attachment 25 of the present invention is adapted to be mounted on the boss 26. The attachment comprises an L shaped frame 27 having a vertical leg 28 and a lateral leg 29 rigidly related to each other. The vertical leg 28 has a half circle bore at its upper end which mates with a split collar 30. These two parts are so formed as to fit around the boss 26. The bore in the split collar and leg 28 is provided with an internal head 31 adapted to fit in key fashion into an annular groove 33 which is standard on all guard mounts such as the boss 26. The split collar 30 is secured to its mating part 28 by bolts 32, which when loose, facilitate adjustment of the frame 27 about the axis of the motor shaft and when tightened, will secure the vertical leg 28 of frame 27 firmly upon the boss 26.

The lateral leg 29 extends rearwardly under the motor 14, parallel to the axis of the motor shaft 13 and as close as possible to the perimeter of the motor housing. The lateral leg 29 has its after end split radially as at 34 from a bore 35 extending through the leg to receive a stud shaft 36 of a yoke 37. The after end of the leg 29 has a bolt 38 threaded across the split portion thereof for drawing the same tightly upon the stud shaft 36.

The yoke 37 is an inverted U shaped member having the stud shaft 36 integral with and extending upwardly from its bight portion 39. The downwardly extending arms 40–40′ of the yoke straddle or embrace a bearing housing 41 in which a spindle shaft 42 is so disposed as to extend forwardly from the L shaped frame 27 in a parallel offset relation to the motor shaft 13.

Both the motor shaft 13 and the offset spindle shaft 42 have a pulley 43 and 44, respectively, mounted thereon and secured thereto. The pulleys 43 and 44 are preferably of the gang groove type although other forms may be equally acceptable. Belts 45 trained around the pulleys 43–44 serve to drivingly connect the offset shaft 42 to the motor shaft 13. An inverted U shaped shroud 46 dimensioned to cover the pulleys and belts is secured to the forward face of the vertical leg 28 of the frame 27.

Referring to FIG. 5 it will be noted that the motor shaft 13 terminates within the confines of the shroud 46 whereas the offset shaft 42 extends forwardly thereof to receive and support a circular saw blade 47. The saw blade 47 is secured to the offset shaft 42 by means of a bolt 48 in the usual manner.

It will be noted that the pulley 44 on the offset shaft 42 as well as the bearing housing 41 extend below the axis of the shaft 42 a minimum distance and appreciably less than in the case of the motor 14 relative to the axis of its motor shaft 13. In the present invention and relatively speaking, there is more than two inches difference between the distances of these obstructing surfaces from their respective shafts. In the case of the offset spindle shaft 42, only about an inch and a quarter to an inch and a half of the radius of the blade 47 is obstructed. Consequently, it is possible to use a blade having a diameter between 8 and 10 inches to cut through a four inch thick wooden member. This results in considerable savings in the cost of blades but more especially enables the use of worn 16 inch blades which have been filed down to a diameter less than one that can be used on the motor shaft 13 in the conventional manner.

The original blade guard 49 can be used to cover the blades 47 mounted on the offset shaft 42 by applying a bracket 50 to the back wall of the guard 49. This bracket 50 is provided with a back turned lip 51 bored to fit a threaded stud 52 on the bight of the shroud 46 for hanging thereon and securing thereto by means of a nut 53. As best seen in FIG. 6 the bracket 50 is secured to the mounting segment 54 of the original saw guard which segment 54 has radially extending ears 55–55' provided with threaded studs 56–56' which extend through arcuate slots 57–57' in the back wall of the guard 49 for centering and adjusting the latter relative to the blade prior to securing of the guard to the studs 56–56' by means of wing nuts 58–58'.

One of the features of the attachment 25 is the universal adjustment of the offset shaft 42 in relation to the motor and motor shaft 13. This universal adjustment is made about two axes, one A which is vertical and the other B which is horizontal. The vertical axis A is that of the stud shaft 36 of the yoke 37 and the horizontal axis B is that of a pair of aligned mounting pins 59, one through each of the arms 40–40' of the yoke 37 and journaled trunnion fashion in the sides of the bearing housing 41 from which the offset shaft 42 extends.

As best seen in FIGS. 3 and 6, a pair of arms 60–60' are secured to the sides of the bearing housing 41 adjacent the depending arms 40–40', respectively. A cross block 61 is pivotally mounted between the ends of the arms 60–60' beneath the after end 62 of the bight portion 39 of the yoke 37. The cross block 61 has a bore extending vertically therethrough substantially perpendicular to the axis of the offset shaft 42. A bolt 63 having its head welded to the underside of the bight portion 39 of the yoke 37 has its threaded shank disposed to extend through the bore in the cross block 61. The threaded shank of the bolt 63 has a nut thereon on both the top and bottom of the cross block 61. By adjusting the nuts on the threaded shank of bolt 63, the bearing housing 41 and the offset shaft 42 can be adjusted by rocking of the latter in a vertical plane about the axis B. The entire yoke 37 can be swung in a horizontal plane about axis A by loosening the bolt 38 at the clamp-like vertical portion 29 of the frame 26. In this manner the offset shaft 42 can be adjusted as close as possible into parallel relation with the motor shaft 13 and the blade 47 thereby secured in true cutting relation on the radial arm saw.

Referring to FIG. 1 it will be noted that the offset shaft 42 may be set at various angles relative to the motor shaft 13 by loosening of the bolts 32 on the split collar 30 and then swinging the entire attachment 25 about the mounting boss 26 before securing the bolts 32. In FIG. 2 it will be noted that the saw with attachment 25 thereon can be adjusted into various angles about the axes of the trunnion bosses 15 at the sides of the motor 14.

In FIG. 4 the attachment 25 is shown to have an arcuate brace 65 formed integrally with the shroud 46. This arcuate brace 65 matches substantially one quadrant of the span of the original blade guard 49. The arcuate portion 66 of the brace 65 serves as a hand grip by which the operator can manipulate the radial arm saw with the attachment 25 in place.

The brace 65 also has a threaded stud 52' formed at one end of its radial brace 67. This stud 52' is identical to the one 52 on the shroud 46 and is located 90° therefrom. It serves as an alternate mounting for the bracket 50 in the event the attachment 25 is adjusted at the split collar 30 to extend the bolt and pulley arrangement horizontally from the axis of the motor shaft 13.

While I have described the attachment for radial arm saws in specific detail it will be appreciated by those skilled in the art that the same may be modified, varied and/or altered without departing from the spirit of my invention. I therefore desire to avail myself of all such modifications, variations and/or alterations as may fairly come within the purview and scope of the appended claims.

What I claim as new and desire to protect by Letters Patent is:

1. In combination with a saw of the type customarily adapted to have a circular blade mounted on the shaft of a motor suspended for universal movement from an overhead support; an attachment facilitating a greater depth of cut with a smaller diametered blade than one mounted directly on said motor shaft comprising:
   (a) an L shaped frame having a vertical leg disposed against the blade supporting side of such motor and a horizontal leg extending therefrom beneath and in close proximity to said motor,
   (b) means for mounting the vertical leg of said frame on the blade supporting side of said motor,
   (c) a yoke suspended from the horizontal leg of said frame,
   (d) a bearing housing mounted in said yoke having a diameter substantially less than that of such motor,
   (e) a spindle shaft supported for rotation by the bearing in said bearing housing and in offset parallel relation to said motor shaft for receiving and supporting a circular saw blade, and
   (f) means for drivingly connecting said spindle shaft to said motor shaft,
   (g) said yoke having a bight portion disposed beneath the horizontal leg of said frame and a pair of depending arms embracing said bearing housing, means for mounting said bearing housing trunnion fashion between the depending arms of said yoke facilitating swing of said bearing housing and spindle shaft in a vertical plane about a horizontal axis, and means between the bight portion of said yoke and said bearing housing for securing the latter relative thereto.

2. The attachment in accordance with claim 1 in which said means for securing the bearing housing relative to the bight portion of said yoke comprises:
   (a) a pair of rearwardly extending arms having their fore ends secured to the sides of said bearing housing,
   (b) a cross block pivotally mounted between the after ends of said pair of rearwardly extending arms, said cross block having a bore formed therethrough, a bolt secured to the after end of the bight portion of said yoke and having its threaded shank extended through the bore in said cross block, and bolt means on said threaded shank engaging the top and bottom sides of said cross block.

3. In combination with a saw of the type customarily adapted to have a circular blade mounted on the shaft of a motor suspended for universal movement from an overhead support; an attachment facilitating a greater depth of cut with a smaller diametered blade than one mounted directly on said motor shaft comprising:
   (a) an L shaped frame having a vertical leg disposed against the blade supporting side of such motor and a horizontal leg extending therefrom beneath and in close proximity to said motor,
   (b) means for mounting the vertical leg of said frame on the blade supporting side of said motor,
   (c) a yoke suspended from the horizontal leg of said frame,
   (d) a bearing housing mounted in said yoke having a diameter substantially less than that of such motor,
   (e) a spindle shaft supported for rotation by the bearing in said bearing housing and in offset parallel relation to said motor shaft for receiving and supporting a circular saw blade, and
   (f) means for drivingly connecting said spindle shaft to said motor shaft,
   (g) said means thereof for mounting the vertical leg on said motor comprising in combination with the standard guard mount bearing boss on the blade supporting side of the motor, a split collar on the upper end of said vertical leg having a bore conforming to the guard mount and embracing the same for angularly adjusting said L shaped frame about the axis of the motor shaft, and
   (h) means for clampingly securing said split collar to said guard mount bearing boss.

4. The attachment in accordance with claim 3 in which:
   (a) a bight portion disposed beneath the horizontal leg of said frame and a pair of depending arms embracing the bearing housing for the spindle shaft bearing,
   (b) means for mounting said bearing housing trunnion fashion between the depending arms of said yoke facilitating swing of said bearing housing and spindle shaft in a vertical plane about a horizontal axis, and
   (c) means between the bight portion of said yoke and said bearing housing for securing the latter relative thereto.

5. The attachment in accordance with claim 4 in which said means for securing the bearing housing relative to the bight portion of said yoke comprises:
   (a) a pair of rearwardly extending arms having their fore ends secured to the sides of said bearing housing,
   (b) a cross block pivotally mounted between the after ends of said pair of rearwardly extending arms, said cross block having a bore formed therethrough, a bolt secured to the after end of the bight portion of said yoke and having its threaded shank extended through the bore in said cross block, and bolt means on said threaded shank engaging the top and bottom sides of said cross block.

6. The attachment in accordance with claim 1 in which the means thereof for mounting the vertical leg on said motor comprises in combination with the bearing boss on the blade supporting side of the motor which has an annular groove providing a standard guard mount thereon:
   (a) a split collar on the upper end of said vertical leg having a bore conforming to the bearing boss for embracing the same,
   (b) a bead formed in the bore in the split collar on the upper end of said vertical leg disposed to fit into the groove of said standard guard mount, and
   (c) means for securing said split collar to the upper end of said vertical leg facilitating angular adjustment of said L shaped frame about the axis of the motor shaft and for clampingly securing said L shaped frame upon said bearing boss.

7. The attachment in accordance with claim 6 in which said means for securing the bearing housing relative to the bight portion of said yoke comprises:
   (a) a pair of rearwardly extending arms having their fore ends secured to the sides of said bearing housing,
   (b) a cross block pivotally mounted between the after ends of said pair of rearwardly extending arms, said cross block having a bore formed therethrough, a bolt secured to the after end of the bight portion of said yoke and having its threaded shank extended through the bore in said cross block, and bolt means on said threaded shank engaging the top and bottom sides of said cross block.

References Cited
UNITED STATES PATENTS 3,099,298  7/1963  Bellini.
3,104,687  9/1963  Field _____ 143—6

DONALD R. SCHRAN, *Primary Examiner.*